US011368835B2

(12) United States Patent
Khris

(10) Patent No.: US 11,368,835 B2
(45) Date of Patent: Jun. 21, 2022

(54) METHOD FOR VERIFYING THE VALIDITY OF A USER'S TELEPHONE LINE

(71) Applicant: ONOFF TELECOM, Paris (FR)

(72) Inventor: Taïg Khris, Paris (FR)

(73) Assignee: ONOFF TELECOM, Paris (FR)

( * ) Notice: Subject to any disclaimer, the term of this patent is extended or adjusted under 35 U.S.C. 154(b) by 9 days.

(21) Appl. No.: 16/648,553

(22) PCT Filed: Sep. 19, 2018

(86) PCT No.: PCT/EP2018/075348
§ 371 (c)(1),
(2) Date: Mar. 18, 2020

(87) PCT Pub. No.: WO2019/057770
PCT Pub. Date: Mar. 28, 2019

(65) Prior Publication Data
US 2020/0228965 A1 Jul. 16, 2020

(30) Foreign Application Priority Data

Sep. 21, 2017 (FR) ....................................... 1758761

(51) Int. Cl.
*H04W 8/22* (2009.01)
*H04W 4/14* (2009.01)
(52) U.S. Cl.
CPC ............... *H04W 8/22* (2013.01); *H04W 4/14* (2013.01)
(58) Field of Classification Search
CPC ......... H04W 8/22; H04W 4/14; H04W 12/06; H04L 67/04

(Continued)

(56) References Cited

U.S. PATENT DOCUMENTS

| 2003/0128822 A1* | 7/2003 | Leivo | G06F 21/42 |
| | | | 379/93.02 |
| 2009/0098887 A1* | 4/2009 | Baek | H04W 8/14 |
| | | | 455/456.1 |

(Continued)

FOREIGN PATENT DOCUMENTS

CN 106162527 A 11/2016

OTHER PUBLICATIONS

Search Report from French Intellectual Property Office on corresponding FR application (FR1758761) dated Mar. 19, 2018.

(Continued)

*Primary Examiner* — Michael Y Mapa
(74) *Attorney, Agent, or Firm* — Klein, O'Neill & Singh, LLP

(57) ABSTRACT

The present invention relates to a method for verifying the validity of a user's telephone service subscription card, comprising the following steps: initiating a validation procedure, downloading to the communication terminal from the validation server a dynamically generated validation code associated with the validation procedure, creating a mini-message on the communication terminal for a technical validation number and containing the validation number, verifying the correspondence between the validation code contained in the received mini-message and the dynamically generated validation code, and validating the user's telephone line number since, in the previous step, the correspondence between the validation code contained in the received mini-message and the dynamically generated validation code was verified.

18 Claims, 1 Drawing Sheet

(58) Field of Classification Search
USPC .................................. 455/410–411, 418, 558
See application file for complete search history.

(56) References Cited

U.S. PATENT DOCUMENTS

| | | | | |
|---|---|---|---|---|
| 2010/0217997 A1* | 8/2010 | Chai | ....................... | H04L 63/08 |
| | | | | 713/181 |
| 2011/0072499 A1* | 3/2011 | Lin | ..................... | H04W 12/069 |
| | | | | 455/411 |
| 2013/0333008 A1* | 12/2013 | Tapling | ............... | H04L 63/0853 |
| | | | | 726/7 |
| 2014/0128034 A1* | 5/2014 | Xu | ........................ | H04L 67/306 |
| | | | | 455/411 |
| 2015/0038120 A1* | 2/2015 | Larkin | ................... | G06Q 20/32 |
| | | | | 455/411 |
| 2017/0054600 A1* | 2/2017 | Leung | ................. | H04L 41/0246 |

OTHER PUBLICATIONS

International Search Report and Written Opinion on corresponding PCT application (PCT/EP2018/075348) from International Searching Authority (EPO) dated Oct. 15, 2018.

* cited by examiner

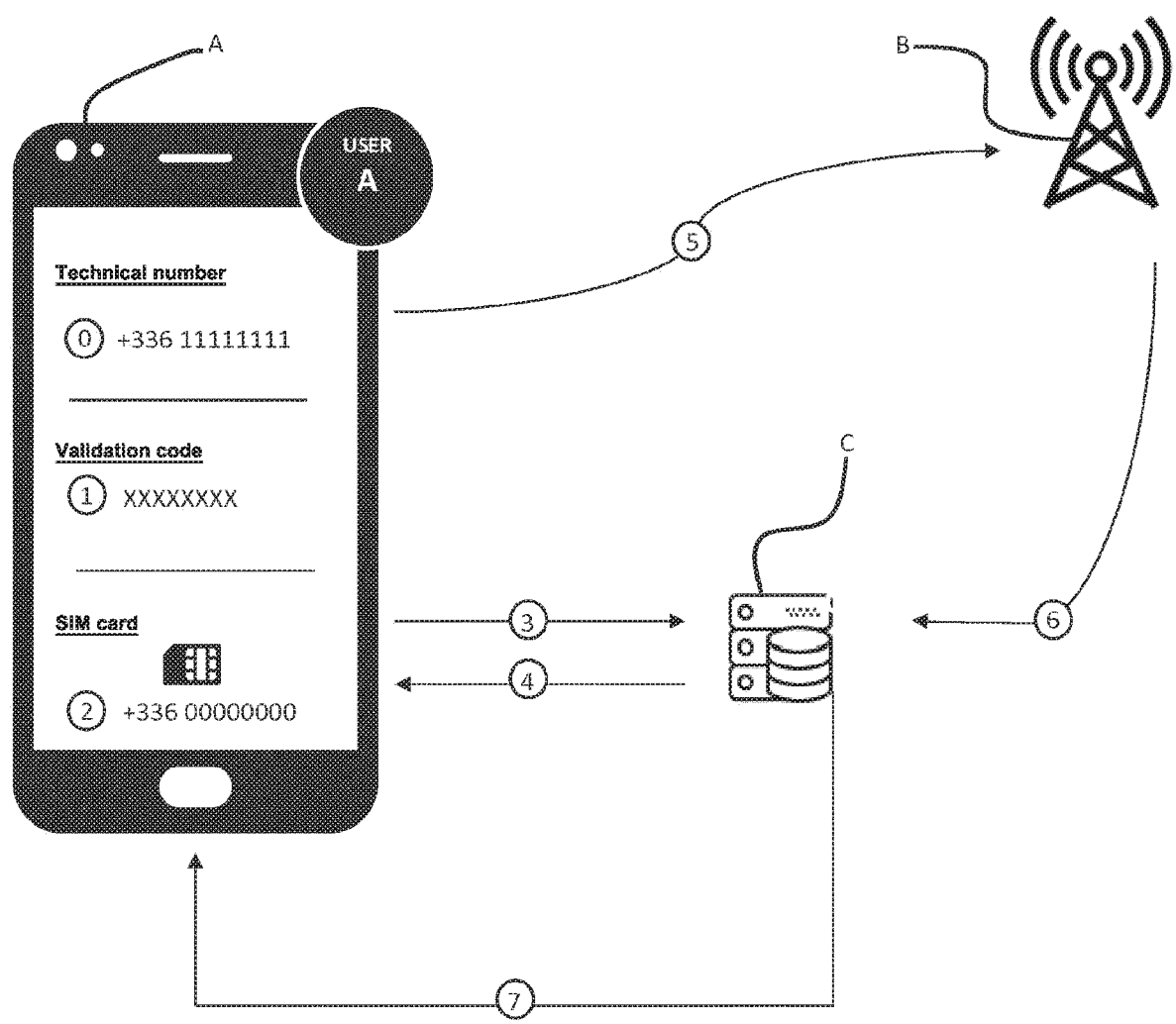

METHOD FOR VERIFYING THE VALIDITY OF A USER'S TELEPHONE LINE

TECHNICAL FIELD

Generally speaking, the invention relates to the authentication of a telephone line of a user of a service or a software application. More precisely, the present invention targets a method making it possible to verify the validity of a SIM card integrated in a communication terminal of a user wishing to activate a service or a software application. The method according to the invention thus makes it possible to verify that a user wishing for example to register himself on a server of a client system, with a view to the use of a service or a software application, in particular implemented by a mobile communication terminal, such as a smartphone, is indeed the holder of a valid telephone line, and to identify said telephone line linked to a valid SIM card present in his smartphone, whether it is a hard SIM or a soft SIM.

It is specified that, as is known to those skilled in the art, a SIM card, SIM being an acronym for "Subscriber Identify Module", is a chip comprising a microcontroller and a memory and constituting a mobile telephone service subscriber card, said card being integrated in a mobile communication terminal, such as a smartphone. Hereafter, such a SIM card is also designated "subscriber card" or "telephone service subscriber card".

The method according to the invention consequently enables the authentication of a user wishing to use a service or a software application by means of a communication terminal, said communication terminal being capable of participating in a telephone link or of sending mini-messages via a telephone communication network, for example of GSM (Global System for Mobile communication, technology also designated 2G), UMTS (Universal Mobile Telecommunications System, technology also designated 3G), LTE (Long Term Evolution, technology also designated 4G) or CDMA (Code Division Multiple Access) type.

When such a user wishes to execute such a service or such a software application on his mobile communication terminal, the publisher or the provider of said service or said software application intends to be able to authenticate said user, in particular by verifying the validity of the telephone line, that is to say the SIM card, associated with the communication terminal used.

BACKGROUND

As is known, numerous providers of services and publishers of software applications for smartphones authenticate the users of their services and software applications by means of the verification of the validity of their telephone lines.

To this end, a widespread technique consists, for the service provider or the software application publisher, in sending a short message, also designated mini-message, of SMS (Short Message Service) type, via a server, destined for a telephone line number provided by the user.

The short message is received on the communication terminal of the user if the latter has correctly provided the number of the telephone line corresponding to the SIM card integrated in his communication terminal. The short message generally comprises an alphanumerical and/or numerical verification code having a limited duration of validity, said verification code having to be copied on an interface, of the web interface type, connected to the server, so that the service provider or software application publisher can verify that the user has indeed received the short message, and thus that the telephone line number that he has provided is valid.

This technique is very widespread and is implemented by numerous service providers and software application publishers, notably at large scale.

Yet, this known technique comprises drawbacks, in particular a non-negligible cost, attached to the cost of sending short messages, and a risk of interception of the short messages sent, allowing third parties to identify themselves wrongfully.

Moreover, the cost corresponding to the sending of a short message for each validation, although it may already prove to be important, in fine, when the volume of users is high, may be further multiplied when, for reasons of congestion of telephone networks, the short message sent is not received by the user, or at least is not received immediately, such that said user repeats the gesture, generally a simple click on a validation button, generator of the short message, multiplying the costs of the validation procedure.

In addition, the delivery of short messages is not secure, and the short messages sent by the server may be intercepted and exploited by third parties, independent of the user.

To overcome these drawbacks, the present invention proposes a method for verifying the validity of a telephone line associated with a communication terminal by means of which a user wishes to register himself to use a service or a software application.

The method according to the invention does not require the sending of short messages by the service provider or the software application publisher. Furthermore, it enables a secure validation of the telephone line implemented by the user.

To this end, the method according to the invention proposes the creation of a technical number, corresponding for example to a local call number of the country wherein is found the user, and the automatic or semi-automatic sending of a mini-message, by the user, destined for said technical number, comprising a validation code.

The method provides to generate the transmission of said mini-message in a visible or invisible manner by the user.

SUMMARY

More precisely, the invention targets a method for verifying the validity of a user's telephone service subscriber card, with a view to enabling said user to use a service or a software application, by means of a communication terminal comprising said subscriber card, the method comprising the following steps:

the initiation of a validation procedure associated with the user and with said service or with said software application, the connection of the communication terminal to a validation server, the downloading, on the communication terminal, of a validation code dynamically generated by the validation server and associated with the validation procedure, the creation of a mini-message, on the communication terminal, destined for a technical validation number and containing the validation code, the sending of the mini-message by the communication terminal, via the subscriber card, in an automatic or manual manner, the reception of the mini-message by the validation server, the verification of the correspondence between the validation code contained in the mini-message received and the dynamically generated validation code, and the validation of the subscriber card of the user in so far as, at the preceding step, the correspondence between the validation code contained in the mini-message received and the dynamically generated validation code has been verified.

Thanks to the method according to the invention, the service provider or the software application publisher saves money in so far as it does not have to send short messages to each of the users wishing to use said service or said software application.

According to an embodiment, the technical validation number corresponds to a local call number of the country wherein is found the user.

To know the country wherein is found the communication terminal, the service or the application having generated the validation procedure or the validation server can interrogate the subscriber card. Thence, the technical validation number used may be chosen as being a local call number of the country wherein is found the communication terminal.

According to an embodiment, the technical validation number is downloaded on said communication terminal, from said validation server.

According to another embodiment, the technical validation number is pre-recorded on said communication terminal.

According to an embodiment, the validation procedure has a predetermined maximum duration.

According to an embodiment, the initiation step is carried out by the communication terminal of the user and comprises the sending of a request to the validation server.

According to an embodiment, the validation code is generated by a client system and said validation code comprises an identifier of the service or the software application with which the validation procedure is associated and the step of verification of the correspondence between the validation code contained in the mini-message received by the validation server and the dynamically generated validation code comprises the verification of the correspondence between the identifier contained in the validation code and the identifier of the service or the software application with which the validation procedure is associated.

According to an embodiment, the step of verification of the correspondence between the validation code contained in the mini-message received and the dynamically generated validation code is carried out by a client system.

According to an embodiment, the step of verification of the correspondence between the validation code contained in the mini-message received and the dynamically generated validation code is carried out by the validation server.

According to an embodiment, the method furthermore comprises the obtaining, by the validation server after reception of the mini-message, of a telephone line number associated with the subscriber card, the step of validation requiring that said telephone line number associated with the subscriber card has been obtained.

According to an embodiment, said validation server notifies said telephone line number to a client system.

According to an embodiment, if no mini-message destined for the technical validation number is received by the validation server, said validation server notifies a failure of the validation procedure.

The user can then not be authorised to use the service or the software application.

BRIEF DESCRIPTION OF THE DRAWINGS

The invention will be better understood on reading the description that follows, given uniquely as an example, and by referring to the appended FIG. 1 which represents the functional block diagram of the method according to the invention.

DETAILED DESCRIPTION

It is recalled that the present invention is described hereafter using different non-limiting embodiments and is capable of being implemented in alternatives within the reach of those skilled in the art, also targeted by the present invention.

In the remainder of the description, "communication terminal" is taken to mean any electronic device, notably any mobile telephone of "smartphone" type, provided with computation means and data storage means and capable of transmitting and receiving mini-messages and data via a telephone and/or data communication network.

In FIG. 1, the communication terminal A is thus, in particular, a smartphone connected to a telephone communication network and to a data communication network.

It is recalled that a telephone communication network consists of a private or extended communication infrastructure enabling the connection of a plurality of items of communication equipment, such as servers, commutation switches, databases and communication terminals. In a known manner, the communication infrastructure of a telephone communication network forms a wireless and/or wired network. In particular, in the context of the invention, the telephone communication network is of GSM, CDMA, UMTS or LTE type.

It is also recalled that a data communication network consists of a private or extended communication infrastructure enabling the connection of a plurality of items of communication equipment, such as servers, commutation switches, databases and communication terminals for example. In a known manner, the communication infrastructure of a data communication network forms a wireless and/or a wired network. In the context of the invention, the data communication network is notably a network complying with the internet protocol (IP).

With reference to FIG. 1, a user User A is represented, provided with a communication terminal A, seeking to access a service or to activate a software application for example.

To authenticate the user User A, the validation server C needs to verify the validity of the telephone line associated with the communication terminal A implemented by the user User A. In other words, the validation server C has to verify the validity of the subscriber card 2 of the user User A.

According to the invention, the method for verifying the validity of the subscriber card 2 of the user User A takes place in accordance with the sequence described hereafter.

With reference to FIG. 1, the user User A must obtain the validation of the telephone line associated with his subscriber card 2, integrated in the case in point in the mobile terminal A. Thence, according to the invention, the communication terminal A of the user User A initiates a validation procedure by sending a request 3 to the validation server C. The request is for example sent in HTTP format, HTTP being an acronym known to those skilled in the art, signifying "Hyper Text Transfer Protocol", enabling the sending of standardised internet requests. These requests are delivered by a data communication network. To this end, for example, the user User A must press on a button displayed on the screen of his communication terminal A to initiate a validation procedure.

The validation server C dynamically generates a unique validation code 1 and sends to the communication terminal A a request-response 4, containing the unique validation code 1.

By means of a software application configured in a suitable manner, the mobile communication terminal A opens a mini-message application to create a pre-filled mini-message, comprising the unique validation code 1 and the destination call number. Said destination call number consists in a technical validation number 0, i.e. in FIG. 1+336 11111111. According to an embodiment, this technical validation number 0 corresponds to a local call number of the country wherein is found the user User A. The technical validation number 0 is for example the property of the operator implementing the validation server C. Alternatively, the technical validation number 0 may be any call number, for example a free international call number agreed between a plurality of telephone operators.

Said technical validation number 0 may be pre-recorded on the communication terminal A, for example in the software application mentioned above, or downloaded from the validation server C, notably in the request-response 4, at the same time as the unique validation code 1.

The communication terminal A then transmits (step 5), via the subscriber card 2, the mini-message destined for the technical validation number 0. To this end, the subscriber card 2, in other words a SIM card, which may be a hard or soft SIM card, as described previously, corresponding to a telephone service subscriber card, is notably capable of delivering mini-messages via a telephone communication network B.

According to the chosen embodiment, the transmission of the mini-message may be carried out as a background task, in an automatic and invisible manner for the user User A, or require a confirmation of sending by the user User A, the mini-message and its sending then being visible to the user User A.

The telephone communication network B receives the mini-message, containing the unique validation code 1 and destined for the technical validation number 0. The telephone communication network B transfers said mini-message (step 6) to the owner of the technical validation number 0, and the mini-message is thus delivered to the validation server C. The transfer 6 of the mini-message may be carried out by the telephone communication network B by means of the transmission of a HTTP request, via a data communication network, destined for the validation server C.

The validation server C consequently receives the mini-message transmitted by the mobile communication terminal A, of which the telephone line number, associated with the subscriber card 2, i.e., in FIG. 1, +336 00000000, is transmitted by the telephone communication network B. Said mini-message is destined for the technical validation number 0 and furthermore comprises the unique validation code 1.

According to a preferred embodiment, the validation server C carries out a step of verification of the information received. To this end, the validation server C compares the validation code contained in the mini-message with that generated dynamically several moments beforehand. Advantageously, the validation server C can verify the correspondence between the telephone line number associated with the subscriber card having transmitted the mini-message and that of the subscriber card 2 of the user User A having transmitted the request 3 to initiate the validation procedure.

If the verification of the correct correspondence between this information is positive, the validation server C validates the subscriber card 2 and thus the associated telephone line.

The validation server C can inform the communication terminal A thereof by a request 7. Alternatively or in parallel, the validation server C informs, for example by means of a HTTP request, a client system which may authorise the user User A to use the service or the software application concerned.

According to an alternative embodiment, the validation server C does not carry out the verification step. In this case, the request 7 represented in FIG. 1 comprises the validation code received in the mini-message, the technical validation number 0 and the telephone line number associated with the subscriber card having transmitted said received mini-message, normally corresponding to the subscriber card 2, and the verification step is carried out on the communication terminal A, by means of the software application configured in a suitable manner, or via a client system.

According to an embodiment, the unique validation code 1 comprises an identifier of the service or the software application having generated the validation procedure and the verification step comprises a verification of this identifier.

If the verification step does not make it possible to note the correct correspondence between the unique dynamically generated validation code 1 and that received in the mini-message received by the validation server C or, if need be, between the identifier of the service or the software application having brought about the validation procedure and that contained in the mini-message, then the validation procedure fails and, if need be, the user User A and/or a client system is informed thereof. The user User A can then not be authorised to use the service or the software application.

According to an embodiment, the validation procedure may have a predetermined maximum duration and, if no mini-message is received by the validation server C within said predetermined maximum duration, then the validation procedure fails and, if need be, the user User A and/or a client system is informed thereof.

According to an embodiment, the unique validation code 1 may have a predetermined duration of validity and, if no mini-message is received by the validation server C and verified within said predetermined duration of validity, then the validation procedure fails and, if need be, the user User A and/or a client system is informed thereof.

The invention claimed is:

1. A method for verifying the validity of a telephone service subscriber card of a user, with a view to enabling said user to use a service or a software application, by means of a communication terminal comprising said subscriber card, the method comprising the following steps:
 initiating a validation procedure associated with the user and with said service or with said software application;
 connecting the communication terminal to a validation server;
 downloading on the communication terminal, at a same time, a technical validation number and a dynamically generated validation code by the validation server and associated with the validation procedure;

creating a mini-message that is pre-filled with the technical validation number and the validation code on the communication terminal destined for the technical validation number;

sending the mini-message by the communication terminal via the subscriber card in an automatic or manual manner;

receiving the mini-message by the validation server;

verifying the correspondence between the validation code contained in the mink message received and the dynamically generated validation code; and validating the subscriber card of the user in so far as, at the preceding step, the correspondence between the validation code contained in the mini-message received and the dynamically generated validation code has been verified.

2. The method according to claim 1, wherein the technical number corresponds to a local call number of the country wherein is found the user.

3. The method according to claim 1, wherein the initiation step is carried out by the communication terminal of the user and comprises the sending of a request to the validation server.

4. The method according to claim 1, wherein the validation code comprises an identifier of the service or the software application with which the validation procedure is associated and the step of verification of the correspondence between the validation code contained in the mini-message received by the validation server and the dynamically generated validation code comprises the verification of the correspondence between the identifier contained in the validation code and the identifier of the service or the software application with which the validation procedure is associated.

5. The method according to claim 1, wherein the step of verification of the correspondence between the validation code contained in the mini-message received and the dynamically generated validation code is carried out by a client system.

6. The method according to claim 1, wherein the step of verification of the correspondence between the validation code contained in the mini-message received and the dynamically generated validation code is carried out by the validation server.

7. The method according to claim 1, furthermore comprising the obtaining, by the validation server after reception of the mini-message, of a telephone line number associated with the subscriber card, the step of validation requiring that said telephone line number associated with the subscriber card has been obtained.

8. The method according to claim 1, wherein, if no mini-message destined for the technical validation number is received by the validation server, said validation server notifies a failure of the validation procedure.

9. The method according to claim 1, wherein the mini-message is not an SMS (Short Message Service) message.

10. A method for verifying the validity of a telephone service subscriber card of a user, with a view to enabling said user to use a service or a software application, by means of a communication terminal comprising said subscriber card, the method comprising the following steps:

initiating a validation procedure associated with the user and with said service or with said software application;

connecting the communication terminal to a validation server;

downloading on the communication terminal, at a same time, a technical validation number and a dynamically generated validation code by the validation server and associated with the validation procedure;

opening an application on the communication terminal to create a mini-message that is re-filled with the technical validation number and the validation code on the communication terminal destined for the technical validation number;

sending the mini-message by the communication terminal via the subscriber card in an automatic or manual manner;

receiving the mini-message by the validation server;

verifying the correspondence between the validation code contained in the mini-message received and the dynamically generated validation code; and validating the subscriber card of the user in so far as, at the preceding step, the correspondence between the validation code contained in the mini-message received and the dynamically generated validation code has been verified.

11. The method according to claim 10, wherein the technical number corresponds to a local call number of the country wherein is found the user.

12. The method according to claim 10, wherein the initiation step is carried out by the communication terminal of the user and comprises the sending of a request to the validation server.

13. The method according to claim 10, wherein the validation code comprises an identifier of the service or the software application with which the validation procedure is associated and the step of verification of the correspondence between the validation code contained in the mini-message received by the validation server and the dynamically generated validation code comprises the verification of the correspondence between the identifier contained in the validation code and the identifier of the service or the software application with which the validation procedure is associated.

14. The method according to claim 10, wherein the step of verification of the correspondence between the validation code contained in the mini-message received and the dynamically generated validation code is carried out by a client system.

15. The method according to claim 10, wherein the step of verification of the correspondence between the validation code contained in the mini-message received and the dynamically generated validation code is carried out by the validation server.

16. The method according to claim 10, furthermore comprising the obtaining, by the validation server after reception of the mini-message, of a telephone line number associated with the subscriber card, the step of validation requiring that said telephone line number associated with the subscriber card has been obtained.

17. The method according to claim 10, wherein, if no mini-message destined for the technical validation number is received by the validation server, said validation server notifies a failure of the validation procedure.

18. The method according to claim 10, wherein the mini-message is not an SMS (Short Message Service) message.

* * * * *